Oct. 30, 1923.
E. M. BOUTON ET AL
1,472,151
BRAKE
Filed May 15, 1919
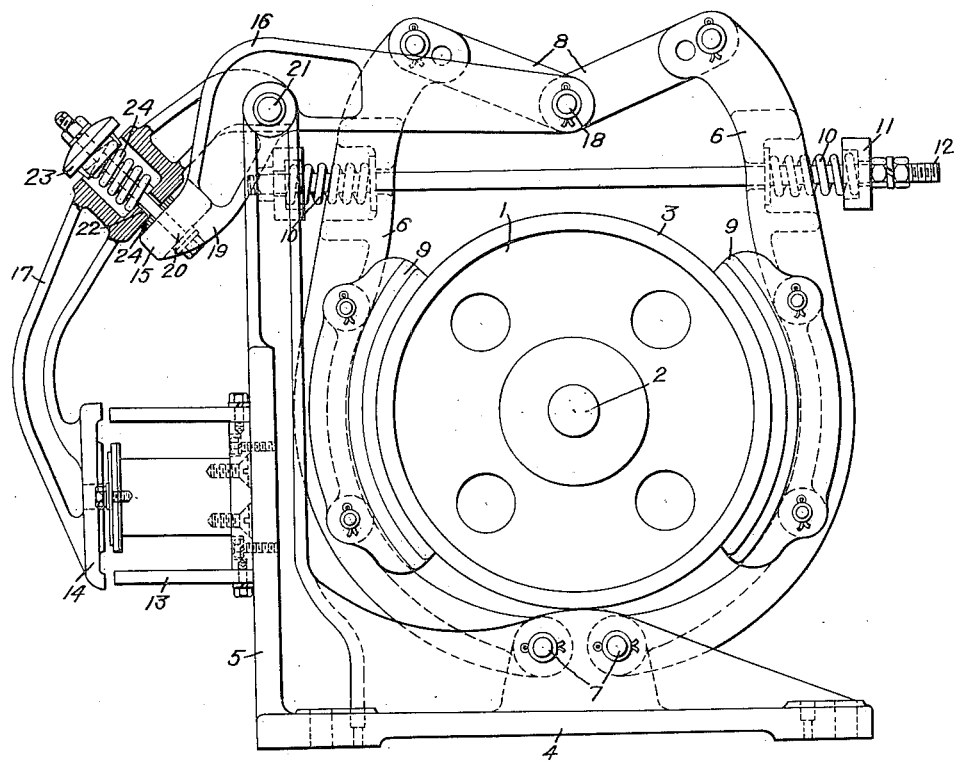
WITNESSES:
J. A. Helsel.
F. A. Lind.
INVENTORS
Edgar M. Bouton
Raoul Pruger.
BY
Wesley G. Carr
ATTORNEY Patented Oct. 30, 1923.

1,472,151

UNITED STATES PATENT OFFICE.

EDGAR M. BOUTON, OF WILKINSBURG, AND RAOUL PRUGER, OF PITTSBURGH, PENNSYLVANIA, ASSIGNORS TO WESTINGHOUSE ELECTRIC & MANUFACTURING COMPANY, A CORPORATION OF PENNSYLVANIA.

BRAKE.

Application filed May 15, 1919. Serial No. 297,337.

*To all whom it may concern:*

Be it known that we, EDGAR M. BOUTON, a citizen of the United States, and a resident of Wilkinsburg, in the county of Allegheny and State of Pennsylvania, and RAOUL PRUGER, a citizen of the United States, and a resident of Pittsburgh, in the county of Allegheny and State of Pennsylvania, have invented a new and useful Improvement in Brakes, of which the following is a specification.

Our invention relates to brakes for hoisting apparatus and similar mechanisms and it has particular reference to brakes that are controlled by electromagnetic devices.

Our invention has for its object to provide a simple and inexpensive means for preventing breaking of the connecting rod between the brake and the electromagnet caused by the sudden force exerted by the inertia of the electromagnet armature when the electromagnet is de-energized.

In the operation of an electromagnetically controlled brake, it has been found that, when the magnet is de-energized, the springs which tend to hold the brake shoes in contact with the brake wheel move the arm upon which the magnet armature is mounted away from said magnet at a relatively high rate of speed, since the springs are unopposed, except by the inertia of the armature, and, on account of the fact that the armature member is relatively heavy, since it must contain enough iron to complete the magnetic circuit of the electromagnet, its inertia, upon being stopped suddenly, when the brake has reached its full "on" position is considerable. As the armature must stop suddenly, a large force is exerted against the arm upon which the armature is mounted that tends to break it. This difficulty has been overcome, in some instances, by utilizing a two-part arm to connect the electromagnet armature to the toggle mechanism of the brake, both parts being pivoted at a single point and having a dash pot interposed between over-lapping portions thereof.

By our invention, we provide a brake having an actuating lever that is composed of two relatively movable arms pivoted at a single point and connected together in such manner that any force exerted by the electromagnet will be transmitted to the braking device as though the actuating lever were a single rigid member but whereby the force exerted by the brake actuating springs will be exerted upon the electromagnet armature through a resilient connection, thereby causing the armature member to stop gradually and avoiding any excessive stresses in the actuating lever. By means of our invention, adjustments of the resiliency of the arm may readily be made.

For a better understanding of our invention, reference may now be had to the accompanying drawing which is an end view, in elevation, of a brake mechanism constructed in accordance with the invention and a wheel to which it is applied. The brake wheel 1 is mounted on a shaft 2 of an electric motor (not shown) and is provided with a suitable periphery 3 that is adapted for frictional engagement with co-operating shoes. The brake comprises a base member 4 that is adapted to be mounted upon any suitable support and comprises an upright portion 5. Two curved levers 6 are pivotally supported upon pins 7 that are located near the central portion of the base member 4. The arms 6 extend upwardly at the sides of the wheel 1 and are connected, at their upper ends, by links 8 which coact to form a toggle joint. Each of the levers 6 is provided with a brake shoe 9, the two shoes being located at diametrically opposite sides of the wheel 1. The levers 6 are normally pressed toward each other by helical springs 10, the outer ends of which bear against flanged washers 11 that are mounted upon a rod 12 and are restrained from axial movement thereon.

An electromagnet 13, mounted upon the upright portion 5 has a movable armature 14 mounted upon a lever 15 which comprises two arms 16 and 17 that connect the armature 14 to a pin 18 which forms a pivotal connection for the links 8. The arm 16 is provided with a projecting end portion 19 which is connected to an intermediate portion of the arm 17 by means of a rod 20. The rod 20 is mounted, in threaded engagement with a portion of the arm 19 that is offset to lie in the rotational plane of the arm 17 about a pin 21, by means of which pin the arms 16 and 17 are pivotally mounted upon the support 5. The rod 20 extends through a loosely fitting opening 22 in the member 17 and is provided, at its outer end, with a threaded nut 23. A compression spring 24 surrounds the rod 20 and is disposed between the nut 23 and the member 17. The member 19 engages the member 17 through a substantially non-compressible washer member 25 disposed therebetween.

From the foregoing description, it will be understood by those skilled in the art that any force exerted by the electromagnet will tend to move the member 17 about the pin 21 in a counter-clockwise direction. The lever 17 will engage the opposite portion 19 of the lever 16 through the washer 25, thus providing a substantially rigid connection for any forces exerted by the electromagnet. Any forces exerted by the member 16, caused by the action of the springs 10 when the electromagnet releases its armature, are transmitted to the member 17 through the the washer 25. When the member 16 ceases its movement, on account of the fact that the brake shoes are in engagement with the brake wheel further movement of the members 14 and 17, caused by their inertia, is opposed by the spring 24, so that they are brought to a stop gradually, thus avoiding any excessive strains on the members 16 and 17.

By reason of having the nut 23 in threaded engagement with the rod 20, the compression of the spring 24 and, therefore, the resiliency of the brake-actuating lever may be varied at will. It will also be observed that a device constructed in accordance with our invention will be equally adaptable for either indoor or outdoor service.

While we have shown and described our invention in one of its preferred forms, it will be obvious to those skilled in the art that it is not so limited but is susceptible of various minor changes and modifications without departing from the spirit thereof and we desire, therefore, that only such limitations shall be placed thereupon as are imposed by the prior art or are specifically set forth in the appended claims.

We claim as our invention:

1. In a brake, the combination with a brake shoe and an electro-magnetic actuating device therefor, of a stationary member, means for connecting said device to said shoe comprising a pair of levers, each of which is pivotally mounted on said member, an armature member carried by one of said levers, and a shock-absorbing device mounted between said levers.

2. In a brake, the combination with a brake shoe, and an electro-magnetic actuating device therefor, of a supporting member, means for connecting said device to said shoe comprising a pair of levers, each of which is pivotally mounted on said member, an armature member carried by one of said levers, and a resilient connection mounted between relatively movable portions of said levers.

3. In a brake, the combination with a brake shoe, and an electromagnetic actuating device therefor, of means for connecting said device to said shoe comprising a pivotally-mounted arm, an armature member carried thereby and a second arm resiliently connected to the first arm.

4. In a brake, the combination with a brake shoe and an electro-magnetic actuating device therefor, of means for connecting said device to said shoe comprising a pivotally-mounted arm operatively connected to said device, and a second arm resiliently connected to the first arm between its point of pivotal support and its point of operative connection to said device.

5. In a brake, the combination with a brake shoe, and an electro-magnetic actuating device therefor, of means for connecting said device to said shoe comprising two arms having a common pivotal support and a resilient connection therebetween whereby said arms are relatively fixed with respect to forces tending to cause movement in one direction and are relatively movable with respect to forces tending to cause movement in the opposite direction.

6. In a brake, the combination with a brake shoe, and an electromagnetic actuating device therefor, of a stationary member, means for connecting said device to said shoe comprising two arms pivotally mounted on said member, said arms being resiliently connected at the extremity of one arm and at an intermediate portion of the other arm.

In testimony whereof, we have hereunto subscribed our names this 29th day of April, 1919.

EDGAR M. BOUTON.
RAOUL PRUGER.